(12) United States Patent
Mears

(10) Patent No.: US 8,804,047 B2
(45) Date of Patent: Aug. 12, 2014

(54) METHOD AND APPARATUS FOR ENABLING THE DISPLAY OF A TEXT SERVICE UPON AUDIO MUTING

(75) Inventor: Mark Gilmore Mears, Zionsville, IN (US)

(73) Assignee: Thomson Licensing, Boulogne-Billacourt (FR)

(*) Notice: Subject to any disclaimer, the term of this patent is extended or adjusted under 35 U.S.C. 154(b) by 1317 days.

(21) Appl. No.: 11/795,962

(22) PCT Filed: Jan. 31, 2005

(86) PCT No.: PCT/US2005/003075
§ 371 (c)(1),
(2), (4) Date: Jul. 24, 2007

(87) PCT Pub. No.: WO2006/085845
PCT Pub. Date: Aug. 17, 2006

(65) Prior Publication Data
US 2009/0122131 A1    May 14, 2009

(51) Int. Cl.
*H04N 5/60* (2006.01)
*H04N 21/488* (2011.01)
*H04N 5/445* (2011.01)

(52) U.S. Cl.
CPC .............. *H04N 5/44513* (2013.01); *H04N 5/60* (2013.01); *H04N 21/4884* (2013.01)
USPC ............................ 348/632; 348/468; 348/563

(58) Field of Classification Search
USPC ................. 348/564, 565, 486, 632, 563, 552; 725/72–85
See application file for complete search history.

(56) References Cited

U.S. PATENT DOCUMENTS

| 5,327,176 | A | * | 7/1994 | Forler et al. ................... 348/564 |
| 5,408,273 | A |   | 4/1995 | Okamura |
| 5,477,277 | A | * | 12/1995 | Shimoyanagida et al. ... 348/632 |
| 6,085,236 | A |   | 7/2000 | Lea |
| 2002/0089517 | A1 |   | 7/2002 | Ludtke et al. |
| 2005/0259751 | A1 | * | 11/2005 | Howard et al. .......... 375/240.26 |

FOREIGN PATENT DOCUMENTS

| CN | 1099921 A | 3/1995 |
| EP | 0614315 | 9/1994 |
| JP | 7-46500 | 2/1995 |
| JP | 7-123376 | 5/1995 |
| JP | 7-123376 A | 5/1995 |
| WO | WO 02/03683 | 1/2002 |

OTHER PUBLICATIONS

Patent Abstracts of Japan, vol. 1995, No. 05, Jun. 30, 1995 & JP 7-046500.
Patent Abstracts of Japan, vol. 1995, No. 08, Sep. 29, 1995 & JP 7-123376 Search Report Dated Aug. 24, 2005.

* cited by examiner

*Primary Examiner* — Michael Lee
(74) *Attorney, Agent, or Firm* — Vincent E. Duffy; Joel M. Fogelson

(57) ABSTRACT

A method for controlling two devices, separated from each other, during an audio muting mode operation. A control device causes an audio device to become muted during the audio muting mode. The control device also causes a video device to output a text service during the duration of the audio muting mode. Preferably, the text service corresponds to the audio portion of a media service.

6 Claims, 4 Drawing Sheets

METHOD AND APPARATUS FOR ENABLING THE DISPLAY OF A TEXT SERVICE UPON AUDIO MUTING

This application claims the benefit, under 35 U.S.C. §365 of International Application PCT/US2005/003075, filed Jan. 31, 2005, which was published in accordance with PCT Article 21(2) on Aug. 17, 2006 in English.

FIELD OF THE INVENTION

This invention is related to the field of audio and video devices, particularly the display of a text service upon the muting of an audio device.

BACKGROUND OF THE INVENTION

With the introduction of digitally based television transmissions set to be completed in the United States by the end of 2006, all analog based television transmissions are set to be eliminated. In order to receive such digitally based transmissions, a user will either need an High Definition television (HDTV) with an integrated digital-TV tuner or a receiver set top box (with a built in digital-TV tuner) that can be connected to an existing analog television or monitor. Because of the high cost involved in buying an HDTV, many users will opt to use a digital set top box with their older analog television to receive the digital television signals instead of buying a new television set.

One issue with digitally based television transmissions is the requirement that such television sets be capable of processing closed captioned text. Specifically, the United States government requires that many based television shows be broadcasted with closed captioning text in accordance with the Electronic Industries Association-708 (EIA-708) broadcast standard. Unfortunately, only HDTV television sets would be capable of receiving EIA-708 based text services because, the older television sets are not equipped to receive and decode such text services.

When using a set top box with an analog television or monitor, a user would then receive an HD television transmission and the EIA 708 text services for use with high definition based television signals. With a digital set top box, a user may miss out on the feature of having closed captioning appear on the display device when muting the volume of a television program. The reason for this is that the set top box is a fixed volume device, where it only outputs an audio signal at constant volume. The actual volume of the television program is controlled at the point of the display device, not the set top box, where the display device controls the emission of the audio signal (from the set top box). Therefore, set top boxes currently do not react in response to a volume muting command and do not present text services when muting occurs, and analog television devices do not display EIA 708 based text services when muted.

This same problem exists also for devices that are networked together (for example using HAVI, or AV/C) where an audio device may be physically separated from a display device. Presently, when an audio device is muted, a display device would have no way of knowing about the audio mute mode or of presenting a text service in response to such a mute mode.

SUMMARY OF THE INVENTION

The present invention is a system that dynamically matches and optimizes the audio and video states available for output by connected multimedia devices without user intervention. The invention also allows a system for the dynamic matching and optimization of audio and video states available for output depending on a selected multimedia service.

The present invention is particularly suited for home entertainment systems comprising a plurality of connected multimedia devices providing audio and video output. The present invention also works with microcomputers and Internet enabled devices that receive multimedia services or objects (as MP3 music files or REAL PLAYER™ files) from a communications network, and are connected to multimedia devices.

DETAILED DESCRIPTION OF THE PREFERRED EMBODIMENTS OF THE INVENTION

Figure 1:
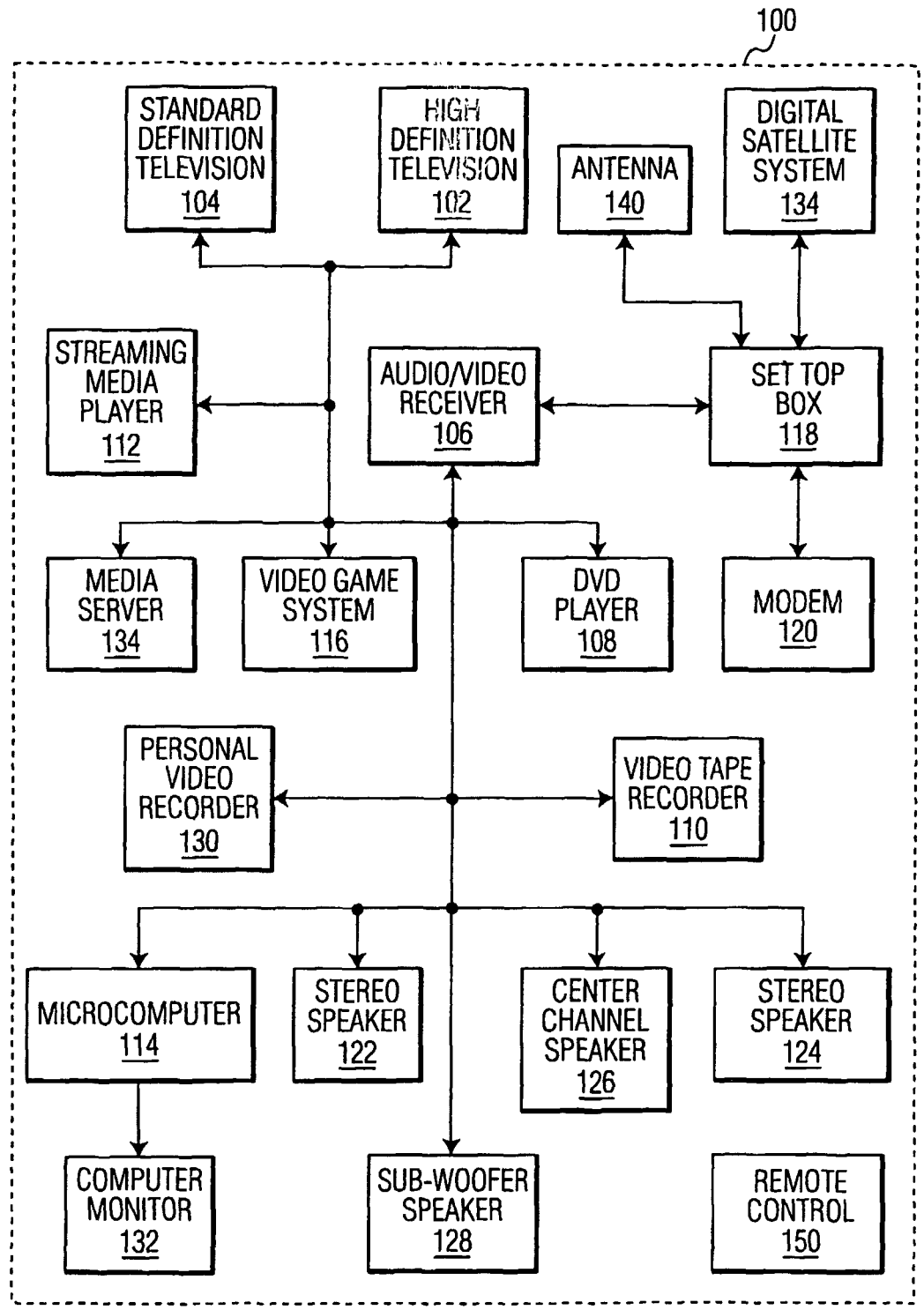
FIG. 1 is a diagram of an entertainment system of audio and video multimedia devices comprising a plurality of connected multimedia devices.

In FIG. 1, an example of audio and video multimedia devices in an entertainment system 100, comprising a plurality of connected multimedia devices, is shown. The multimedia devices forming entertainment system 100 are preferably connected through a wire-based interface (e.g., RCA cables, Ethernet, coaxial cable, phone lines, IEEE-1394 compliant cables, copper wire, serial cables, optical cable, USB) that provides a bi-directional communications between devices. Optionally, the multimedia devices comprising the entertainment system 100 communicate through a wireless interface (e.g., radio frequency, infrared, BLUETOOTH™, 802.11B, 802.11A). Alternatively, the communications are unidirectional utilizing a relationship where one multimedia device is a controller (master) and other multimedia devices (slaves) are coupled to the controller.

The communications between the multimedia devices comprises two levels of. information: multimedia signals (media services) that are generated and processed by selected audio and video output states available from a plurality of connected multimedia devices, and the control information used to manage the connected multimedia devices. The information transmitted is in a digital, analog, and/or a combination thereof data format. For example, the multimedia signals generated by a DVD player 108 while playing a DVD (media service) are a stereo audio signal outputted for a stereo based selected audio output state and a 1080×1920 pixel 60 Hz interlaced video signal outputted for a HD based selected video output state. The control commands are communications signals that are preferably JAVA™ or XML compliant that comport to a packet-based structure (TCP/IP), capable of being processed by a data interface/controller residing internal or used for controlling connected multimedia devices. Optionally, the control information is communicated as a parameter (value) of an electric circuit (e.g., voltage, resistance, current, inductance, capacitance) and/or a change in a parameter of an electric signal (e.g., a change in resistance or voltage). As an alternative embodiment, the information transmitted on both levels is in the form of metadata that complies with a proprietary standard (HAVI, MPEG-7).

Set top box 118 functions as a gateway between entertainment system 100 and media services received from a remote source. Media services are audio-based services (e.g., music, radio based talk show, streaming audio) and/or video-based services (e.g., television shows, movies, computer/video games) capable of being outputted by entertainment system 100 in selected audio and video output states. A remote source (e.g., satellite, Internet, cable, broadcasting antenna, public switched telephone network (PSTN), cellular network, infrared transmitter), as a service provider, transmits media services as signals that are received by multimedia devices as digital satellite system 134, modem 120, and antenna 140, which process the media services for distribution through the entertainment system 100 for use by other multimedia devices connected to audio/video receiver 106, coupled to the set top box 118. Optionally, multimedia devices as digital satellite system 134 and modem 120 bi-directionally communicate with remote sources for requesting media services (for example, a video on demand from a cable service provider) and for performing maintenance for the entertainment system 100 (e.g., downloading a new audio output state, receiving electronic program guide information, upgrading software drivers and codecs).

Optionally, audio/receiver 106 is configured to only operate with either audio signals or video signals, depending on the needs of the system. Hence, set top box 118 may output a video service directly to standard definition television 104 or high definition television 102 without using audio/video receiver 106 as an intermediary. The audio service could then be outputted via audio receiver 106 to speakers 122 and 124, or any other audio output device.

The entertainment system 100 also accommodates and distributes media services available from local sources. The DVD player 108, video tape recorder 110, personal video recorder 130, coupled to the audio/receiver 106, are examples of multimedia devices that provide media services locally (for example, video tape recorder 110 playing a video tape storing a movie) through the use of a swappable medium (e.g., video tape, DVD, computer disc, flash memory, compact disc). Other multimedia devices as the media server 134 and a streaming media player 112, coupled to the audio/receiver 106, provides locally sourced media services from a local fixed storage device (e.g., hard disc drive, optical disc, flash or static RAM). Optionally, the media services stored in the local storage device were received and archived from remote sources or from other multimedia devices connected to the media server 134. Other sources of media services are generated locally by software running on a microcomputer 114 or a video game system 116, that are distributed through a connection to other connected multimedia devices of entertainment system 100.

The entertainment system 100 utilizes multimedia devices for processing and outputting media services in accordance with selected audio and video output states. Audio/video receiver 106 is a multimedia device that matches a source of a media service to multimedia devices that processes and output the media service in a selected audio and/or video output state. For example, DVD player 108 distributes an HD video based media service (of a local or remote origin) via the audio/video receiver 106 to high definition television 106. Preferably the audio/video receiver 106 selects for video based media services a standard definition television 104 for displaying media service supporting an SD state, and high definition television 102 for displaying media services supporting an HD state. Optionally, computer monitor 132 displays a locally based media service generated by the microcomputer 114.

Audio-based media services are supported through audio-based multimedia devices available through the entertainment system 100. Preferably, the audio based services (of local or a remote origin) are outputted by an audio system comprising a group of speakers comprising at least stereo speaker 122, stereo speaker 124, center channel speaker 126, and sub-woofer speaker 128. Optionally, standard definition television 104, high definition television 102, or the computer monitor 132 is used to output an audio-based media service via an audio component in the multimedia device (e.g., an audio speaker). The audio/video receiver 106 can choose a group of speakers from the audio system in accordance with a selected audio output state, wherein a second group of speakers is chosen when the selected audio output state changes.

High definition television 102 is preferably configured to display text services received as part of a video signal or as part of the auxiliary services corresponding to a received video signal. For the receipt of analog based video services, high definition television 102 utilizes an extended data services processor to extract the extended data services or teletext information from the vertical blanking interval of the received video signal. For the receipt of digital based video signals, high definition television 102 uses an extraction processor to extract text from the auxiliary services that correspond to the received video signal. This extraction processor is known in the art for implementation of a text service standard such as EIA-708 or ISO/IEC 13522-5:1997 (MHEG5). Optionally, standard definition 104 and set top box 118 operate in a like manner as described for high definition television 102.

Remote control 150 is a control device that is used to operate devices of entertainment system 100. The control commands from remote control 150 are transmitted wirelessly as infrared or RF commands to the devices of system 100. Preferably, the devices have a built in receiver for receiving such commands. Optionally, at least one of the devices of system 100 may operate as an access point that is used to control other devices of system 100. For example, a device operating as an access point would forward a change channel command to a display device or an audio volume control command to an audio device.

Figure 2:
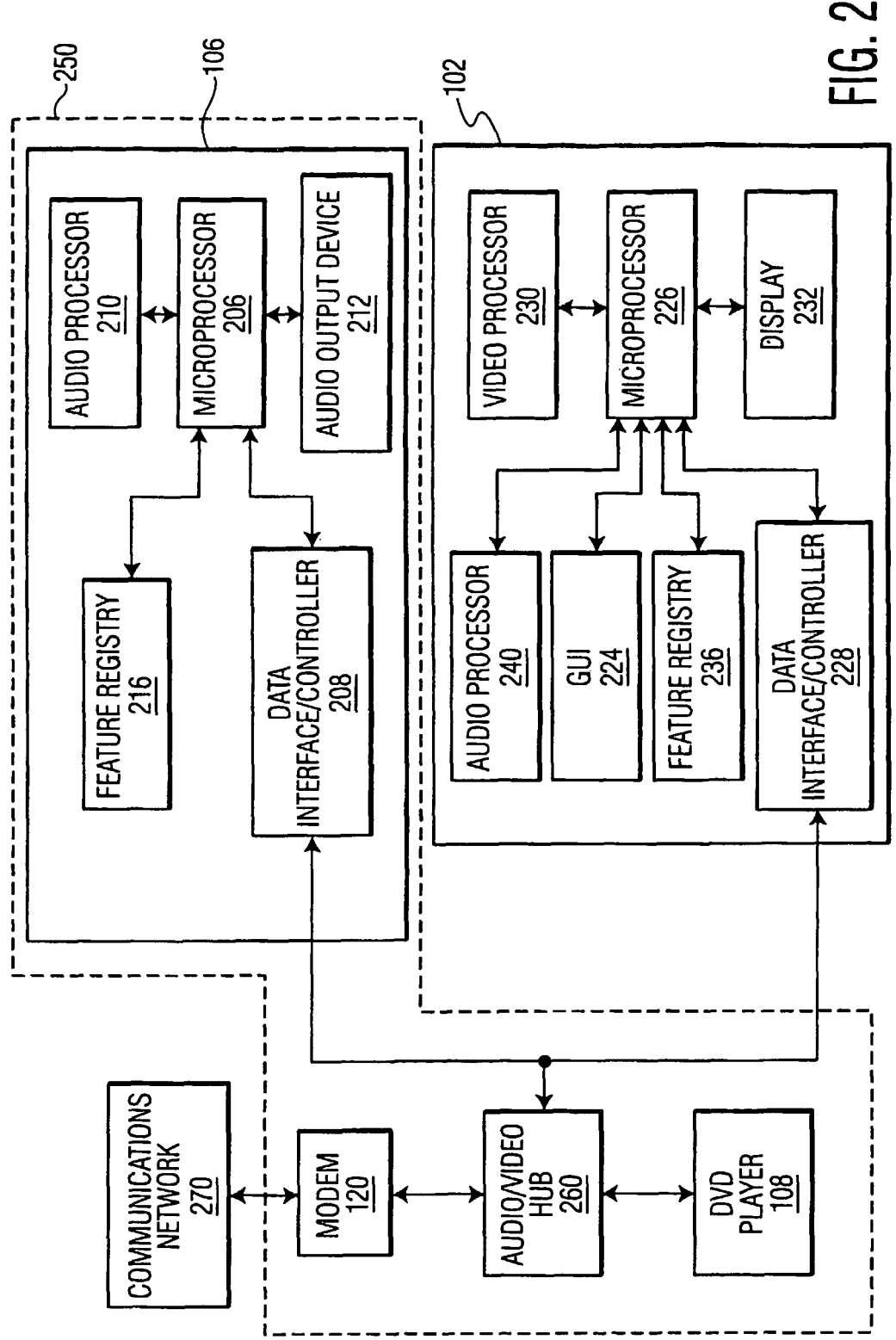
FIG. 2 is a diagram of connected multimedia devices.

In FIG. 2, an example of connected multimedia devices that dynamically match and optimize audio and video output states available for outputting is shown. An audio/video hub 260 interconnects the multimedia devices of entertainment system 250 (modem 120, audio/video receiver 106, DVD player 108) preferably complying with a network standard (USB, IEEE-1394, Ethernet) supporting bi-directional communications between the multimedia devices. Audio and video media services (source signals) are outputted from a DVD player 108 via the audio/video hub 260 to a high definition television 102, and an audio/video receiver 106. The audio/video receiver 106 and the high definition television 102 process and ready for display and/or output the received services (from the DVD player 108) in respect to the audio and video states available for other multimedia device.

A multimedia device, as high definition television 102, has a feature registry 236 that comprises information referring to the audio and video output states supported by the multimedia device. Preferably, the feature registry 236 functions as an updateable buffer comprising data that lists the supported states as metadata or a table of entries that is either read internally or is capable of being communicated to other multimedia devices in response to a query command. Optionally, the supported states are communicated as a parameter (value) of an electric circuit (e.g., voltage, resistance, current, inductance, capacitance) and/or a change in a parameter of an electric signal (e.g., a change in resistance or voltage). Information in the feature registry 236 is updated as audio and/or video output states of a multimedia device are added and/or deleted.

Feature registry 236 is coupled to a microprocessor 226, which communicates and controls the other functional segments of high definition television 102. Data interface/controller 228, coupled to the microprocessor 226, operates as the interface that sends and receives information signals from other connected multimedia devices. Additionally, the data interface/controller 228 parses received communications into the internal format of the high definition television 102, and transmits communications (to the network protocol of the connected multimedia devices) via the use of at least one of translation tables, style sheets (for metadata), decompression means, or compression means. The microprocessor 226 is also connected to a video processor 230 that preferably digitally processes a received video service for output, in accordance with a selected video state (selected by an output state optimization). The processed video service can then be outputted to a display 232, controlled by microprocessor 226. Optionally, a graphical user interface (GUI 224) is available for selecting media services via an electronic programming guide (EPG) and/or for manipulating multimedia devices (e.g., adjusting volume, powering on/off, establishing shortcuts for favorite media services, forcing a selected audio or video output state). The high definition television 102 supports an audio processor 240 for processing audio-based media services.

Audio/video receiver 106 has a microprocessor 106 that controls the other functional segments of the multimedia device. Data interface/controller 208 and feature registry 216, both coupled to microprocessor 106 operate in a manner similar to data interface/controller 226 and feature registry 236 of high definition television 102, described above. The microprocessor 226 also controls an audio processor 210 that preferably digitally processes a received audio service in accordance with an audio state (selected by an output state optimization). The microprocessor 226 then readies for output the processed audio service on an audio output device 212 (for example, audio speakers). Optionally, audio processor 210 processes audio media services with audio enhancements as environmental effects (playback in a concert hall or at a rock concert) and audio signal attributes (adding/subtracting reverb, bass, tremble).

Multimedia devices (high definition television 102 and audio/video receiver 106) interact with modem 120 via a connection through audio/video hub 260. Modem 120 functions as a gateway device with a communications network 270 (e.g., Internet, Local Area Network (LAN), Wide Area Network (WAN), Ethernet, PSTN) to a remote source. A multimedia device (as the high definition television 102) uses modem 120 for receiving/transmitting media services, system maintenance (adding/deleting output states, updating GUI 226), and for communicating with a remote device (computer, multimedia device) accessed through communications network 270 (for example, transmitting a local media service to a server through an Internet connection).

When a user is watching a media service such as a television program on a display device such as high definition television 102, the user may want to mute the sound of the media service. Typically, such a muting function is accomplished directly by the user operating a volume control on the display device or via remote control 150. After the volume is muted, some display devices are configured to display a text service, such as closed captioning, that corresponds to the media service. The text service is displayed until the mute mode is terminated.

The present invention provides a schematic for implementing the display of text during an audio muting mode, when audio and video devices are either separated from each other, or a device that outputs an audio and video service (such as a set top box) is unaware of what occurs at the devices that render such audio and video services. In the prior art, a user must manually activate both the audio muting mode and activate the display of a text mode, if audio and video devices are separated from each other. By using the principles of the present invention, the display of text in view of an audio muting mode occurs without having a user resort to two separate actions.

Figure 3:
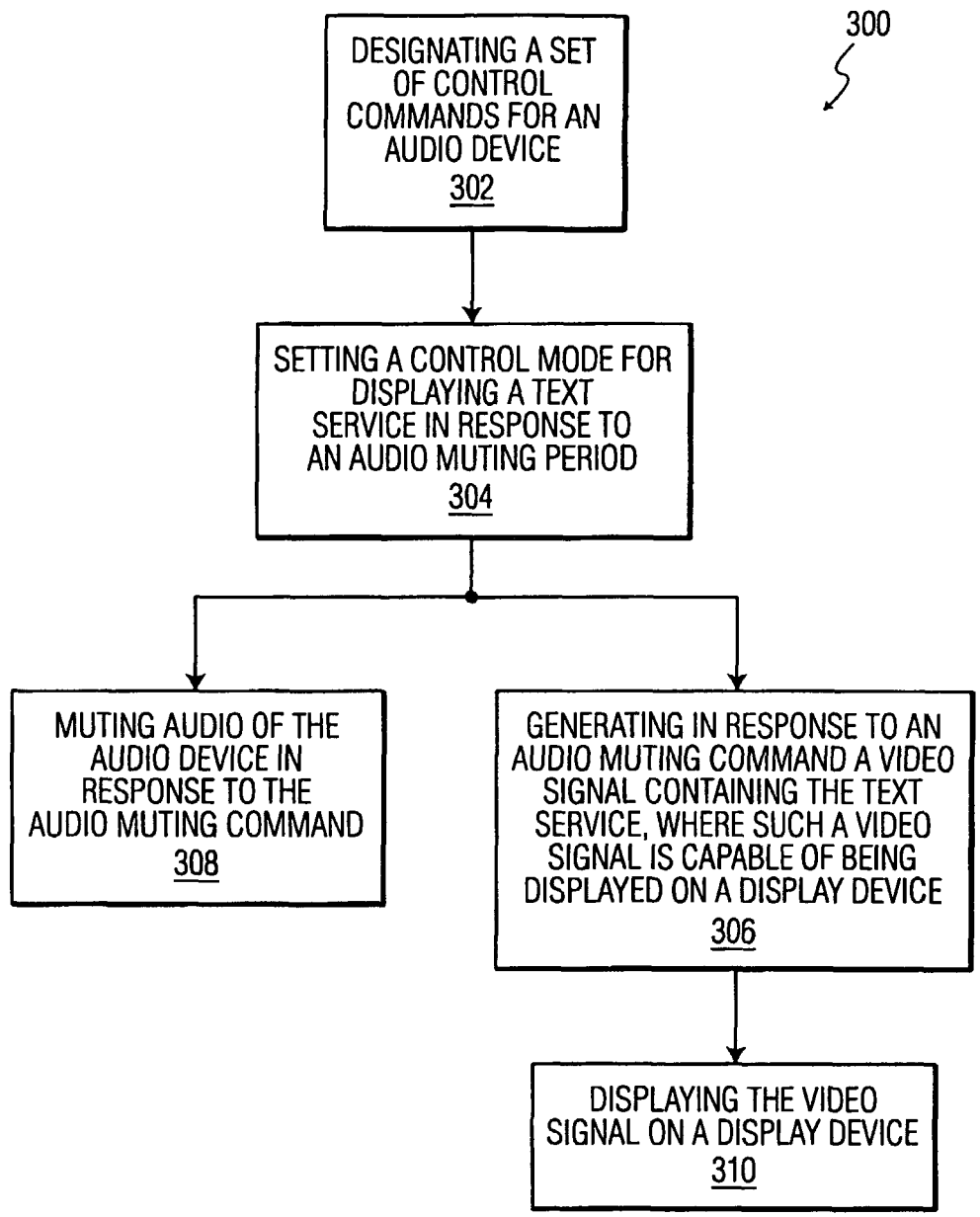
FIG. 3 is a block diagram for displaying a text service in response to an audio muting command, in accordance with an embodiment of the present invention.

FIG. 3 presents a flowchart of a method 300 for implementation the activation of a text service during an audio muting mode. Step 302 begins with a user designating a set of control commands for an audio device. In an embodiment of the present invention, a media service representing a television program is received by set top box 118 where the video portion of the media service is distributed to high definition television 102 and the audio is distributed to audio receiver 106. Control commands such as turning on, off, volume, tremble, bass, and the like that control the operation of receiver 106 is defined in this step. Audio from receiver 106 is capable of being outputted via devices such as stereo speakers 122 and 124.

Typically, control commands are predefined in a remote control 150 where a user enters in a code to designate that the brand and the type of equipment that will be used with the remote control. Alternatively, some remote controls operate with equipment without the user having to define what components will be used with the remote control or a learning remote control may be used that learns control commands from other remote controls. These types of configurations of remote controls are known in the art.

Unlike the prior art, remote control 150 is operated to include an additional mode that affects whether a text mode is to be displayed during a muting operation. In step 304, a user selectively defines a parameter that affects whether an audio muting mode causes a display device to display a text service using the decoded text from a set top box during the duration of the audio muting mode. For example, the user may program a value "ON" into the remote control that enables the display of a text service during an audio muting mode. Likewise, the mode is disabled with the user programs an "OFF" value into the remote control. This selective mode may either be "ON" or "OFF" by default.

The programming of the remote is important because the operation of an audio muting mode, impacts the operation of two separate devices. Hence when an audio muting mode is enabled, remote control 150 transmits an audio muting command to audio receiver 106 or standard definition television 104, effectively muting the audio of the device, in step 308. Likewise, remote control 150 transmits a control command to set top box 118 to display a text service on standard definition television 104 such as closed captioning, teletext, and the like in step 306. Preferably, the text service corresponds to the audio media service such as dialogue or auxiliary information related to the content of a media service. The text service is generated as part of a video signal that is capable of being displayed on a display device. Preferably, the text service is combined with the video of a media service where the text service is either overlaid over the video of the media service or is shown in a separate area of a viewing area of a display device. The text service is displayed on a display device in step 310. The display of the text service is then optionally disabled when the muting operation is terminated via remote control 150, with a muting disable command being transmitted to audio receiver 106 and a text service disable command being transmitted to set top box 118 or standard definition television 104.

In an alternative embodiment of the present invention, set top box 118, audio receiver 106, and high definition television 102 are coupled together via a network interface using a multimedia device standard such as HAVI and the like. Instead of having to rely on the receipt of a command from remote control 150, where each device would have an IR or RF receiver, the HAVI enabled devices could communicate commands to each other over the network. Hence, any commands received by one device are transferable to a second device through the network interface. For example, a mute command received by high definition television 102 would be transmitted to set top box 118 via the network interface.

In a second alternative embodiment for step 302, a user has the ability to train set top box 118 to act in response to a remote control 150. For example, a user activates a remote control training mode in step 302 for set top box 118 via a menu shown via a display device. Next, set top box 118 requests that a user press selected commands on remote control 150. These commands are transmitted from remote control 150 to an IR receiver on set top box 118, where the set top box is capable of determining what control commands are used by remote control 150 to control devices.

In step 304, the user has the option of having set top box 118 deliver a text service in response to a mute command to a display device. This option is selectable via an option on remote control 150, an on screen menu that is generated by set top box 118, and the like. When step 308 is activated, remote control 150 transmits a control command to mute an audio device such as audio receiver 106. This command is also received by set top box 118.

In response to this control command, set top box 118 outputs a video signal containing a text service that is displayable on a display device such as high definition television 102 or high definition television 104 in step 306. This video signal is capable of being displayed on such a display device (as in step 310) until the mute mode is terminated via remote control 150. The command terminated the mute mode is transmitted from remote control 150 to both set top box 118 and audio receiver 106. In response to this mute termination command, set top box 118 stops generating the text service and audio receiver 106 resumes the playback of audio.

Figure 4:
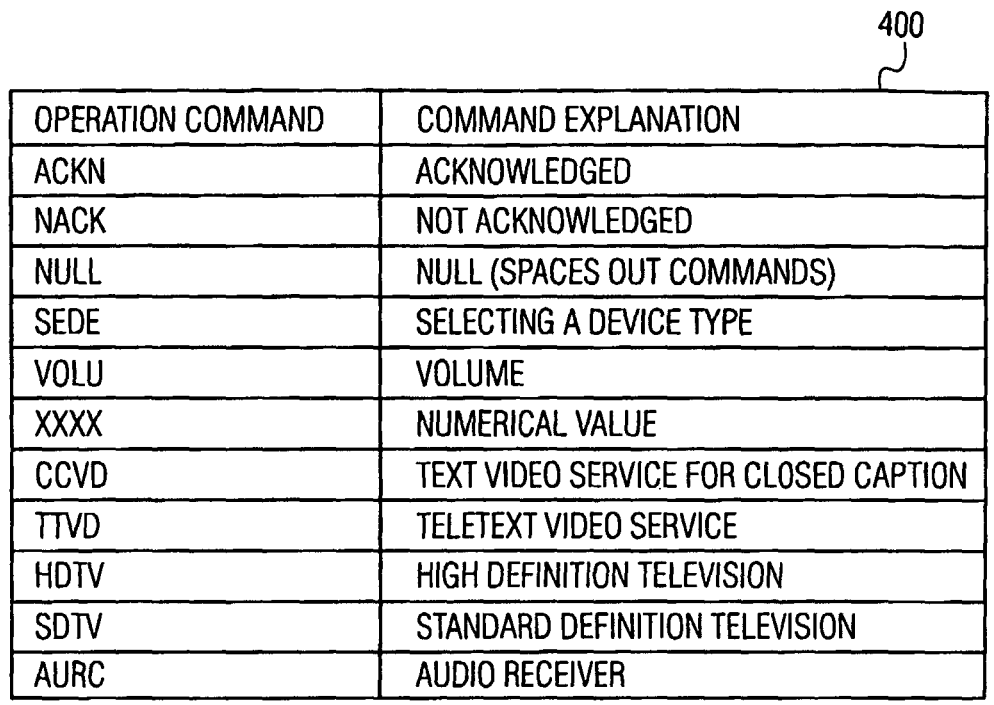
FIG. 4 is a table of commands for the operation of a system of audio and video devices interconnected through a network connection.

A configuration of sample commands 400 are listed in FIG. 4, where such control commands are capable of being transmitted between devices through the network interface. Referring back to FIG. 3, step 302 could be implemented at any of the devices on the network. Hence, a user may use set top box 118 as an access point to control the operation of audio receiver 106 and high definition television 102, where the user designates that the set top box 118 transmit control commands to operate these respective devices. Once defined, set top box 118 forwards an audio media service of a television program to audio receiver 106 and the video portion to high definition television 102.

It is noted, that any device on the network may be used as an access point where audio receiver 106 or high definition television 102 controls set top box 118 and the other device. For example, if high definition television 102 was designated as the access point, the television transmits a SEDE AURC VOLU 0 command to mute the volume of audio receiver 106 during an audio mute mode. Likewise, if audio receiver 106 operates as the access point, the receiver may choose to use standard definition television 104 as a display device by transmitting a SEDE SDTV command or the high definition television 102 by transmitting a SEDE HDTV command. The operational commands also allow the devices to determine if a command was successfully received by sending a ACKN command when successful and a NACK command if a command was not received or was not understood.

In step 304, the set top box 118, as the access point, is selectively enabled, as whether to output a text based media service in response to an audio muting command. This function may be selected as part of an on-screen menu capable of being displayed on a display device, a panel function, via remote control 150, and the like. When such a mode is enabled, set top box 118 transmits a VOLU 0 command to audio receiver 106 during an audio muting mode in step 306.

Likewise, set top box 118 transmits a CCVD 1 command to high definition television 102 indicating to the television as to generate a video signal that contains a text service containing closed captioning information (step 306). Once generated, high definition device 102 displays such a text service (step 310) until the audio muting mode is inactivated. Set top box 118 transmits a VOLU XXXX (not 0) to audio receiver 106 as to resume the playback of audio and a CCVD 0 command to high definition television 102 as to inactivate the display of a text service. Teletext is enabled and disabled with the use of the TTVD command. Other commands may be used in accordance other multimedia standards.

It is noted that is possible that a display device connected to set top box 118 may not have a text service decoder. Hence, when a muting mode is enabled, set top box 118 generates the text service as part of a video media service to be displayed on the display device. Set top box 118 terminates the generation of the video of the text service when the audio muting mode is disabled. In this optional embodiment, set top box 118 is informed about the operation of a muting mode directly as a control command from remote control 150, audio receiver 106, or any other device on the network.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

The invention claimed is:

1. A method for displaying a text service during an audio muting operation comprising the steps of:
   transmitting via an access point an audio muting command to an audio device;
   automatically transmitting via said access point a text service enable command to a video device;
   said audio muting command and text service enable commands are transmitted over a network to which said audio device and said video device are coupled;
   the audio muting command and the text service enable command are performed in response to said received audio mute command received by said access point; and
   said audio and video device are separate devices.

2. The method of claim 1, wherein the access point additionally performs the steps of:
   transmitting an audio media service to said audio device;
   transmitting a video media service to said video device, wherein said audio media service and said video media service are the respective audio and video components of a received media service.

3. The method of claim 2, wherein the text service is part of the received media service.

4. The method of claim 3, wherein the media service is received by at least one of a communications network and terrestrially.

5. The method of claim 1, wherein a remote control transmits the audio muting command and the text service command in response to a single mute command.

6. The method of claim 1, wherein the transmission of the audio muting command and the text service command are selectable wherein in one mode both commands are transmitted and in a second mode only the audio muting command is transmitted.

* * * * *